Dec. 7, 1965    K. M. SANO ETAL    3,221,620
PHOTOGRAPHIC FILM MARKING DEVICE
Filed July 16, 1962    2 Sheets-Sheet 2

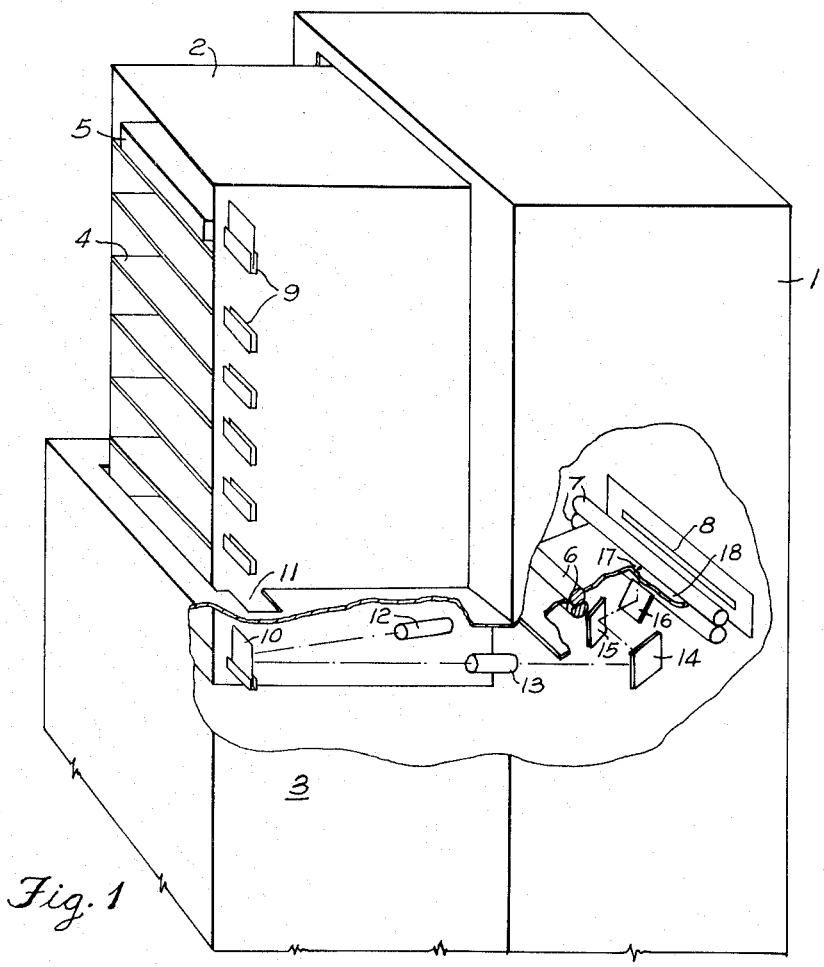
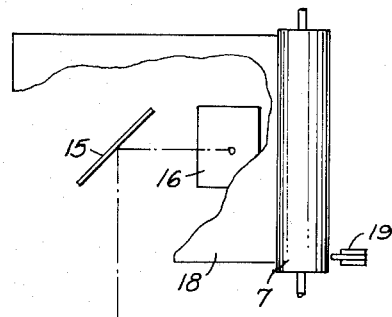
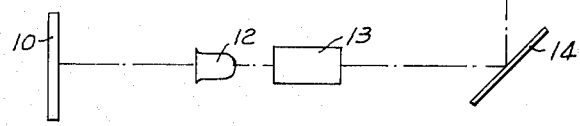

United States Patent Office

3,221,620
Patented Dec. 7, 1965

3,221,620
PHOTOGRAPHIC FILM MARKING DEVICE
Karel Marcel Sano, Borsbeek, and Frederik Juliaan Van Landeghem, Mortsel-Antwerp, Belgium, assignors to Gevaert Photo-Producten N.V., Mortsel, Belgium, a company of Belgium
Filed July 16, 1962, Ser. No. 210,259
Claims priority, application Belgium, July 18, 1961, 40,829
4 Claims. (Cl. 95—1.1)

The present invention relates to a device for identifying X-ray film images, more particularly for identifying medical X-ray film images according to the photographic method.

By photographic method is meant a method according to which the identifying data are put on the image bearing X-ray film sheet by exposure to visible light.

Such a photographic identification method is among others described in the U.S. patent specification 2,036,682 and in an article by Åke Åkerlund in Acta Radiologica, vol. XII, 1931, pp. 95–99. According to these processes a small ticket or a negative, containing the identifying data, is projected onto the exposed film sheet. Although these methods are a considerable improvement compared to those methods wherein the identification is done with lead or other X-ray absorbing indications or marks or by writing directly onto the film sheet, they are still rather complicated. Indeed, when an apparatus is used which after exposure operates automatically to unload an X-ray film sheet cassette, such as described in U.S. Patent No. 3,111,585, subsequently carries off the unloaded X-ray film sheet to a processing apparatus, there is always a loss of time in case the identification of the film sheet is executed according to the above-mentioned methods so that the operator is constantly obliged to interfere. This interference means a derogation to the advantages of the automatic process i.e. unloading the film cassette, and developing, fixing and rinsing this film sheet.

According to the invention a device for identifying X-ray film images, especially medical X-ray film sheet images, wherein the photographic process is applied, comprises a member for holding the identifying data and an optical projecting system in an apparatus for the automatic unloading of X-ray film sheet cassettes, wherein the identifying data are projected onto the X-ray film sheet moving from the cassette, by means of a brief exposure.

The object plane of the optical projecting system is located at the plane of the member for holding the identifying data.

As the marking operation is automatically executed during the unloading cycle of the cassette, it is therefore quite impossible to put a wrong indication or information onto any film sheet.

With reference to the accompanying drawings of a few embodiments the invention will be described hereinafter.

FIG. 1 shows in perspective an automatically operating apparatus for unloading cassettes, the side wall of which is partly omitted to allow a view of the identification device.

FIG. 2 is a schematic top view of the identification device.

Figure 3:
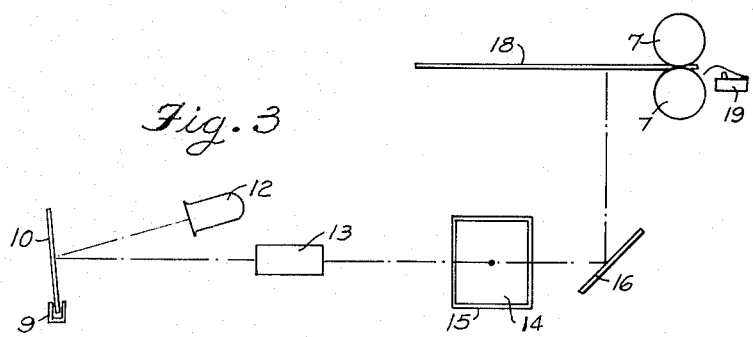
FIG. 3 is a schematic side view of the identification device.

The embodiment represented in FIG. 1 comprises a light-tight casing 1, and a cassette magazine 2 which moves vertically in a chamber 3 which is connected to casing 1. In this casing 1 the driving mechanism for the whole sest of apparatus is installed. The situation in FIG. 1 shows the magazine in its highest position.

The magazine 2 is divided into a number of sections or compartments by means of horizontal partitions 4. On each of these partitions a cassette can be placed. As shown in this figure a cassette 5 is resting in the upper section of the magazine.

The cassettes in the different sections of the magazine are unloaded as soon as each section is positioned at the underside level of the upper surface of the chamber 3, this positioning being realized by the step-wise lowering down of the magazine. At that moment the section containing the cassette to be operated on is light-tightly closed and located in front of the unloading mechanism in casing 1.

This unloading mechanism performs the subsequent operations of unlocking and opening the cassette, gripping the film sheet, closing the cassette and transporting the gripped film sheet between the roller pairs 6 and 7 through the light-tight channel 8, e.g. to a developing and fixing apparatus.

After the magazine is step-wise lowered down into its lowest position so that each section has been successively located in front of the unloading mechanism, an upward movement is imparted to the magazine by reversing the driving mechanism. Contrary to the step-wise downward movement, the upward movement is continuous. The only purpose of the latter movement is to bring the magazine back to its highest position, whereupon the whole unloading operation starts again. During this following unloading operation the previously unloaded cassettes can be removed from the different sections and replaced by other cassettes, containing exposed film sheets, which have to be unloaded.

An apparatus for the automatic unloading of cassettes, containing film sheets is described in detail in U.S. Patent No. 3,111,585.

At the level of each section the embodiment of the present invention represented in FIGURE 1 is provided with U-shaped clips 9 at one sidewall of the magazine 2. A small ticket 10 with identifying data, relating to the cassette located in the corresponding section, is slipped between these clips 9. Through an opening 11 in the upper side of the chamber 3, enclosing the magazine, these tickets 10 can be dropped into the chamber 3 during the downward movement of the magazine. Each time a section of the magazine is located in casing 1 in front of the unloading mechanism, the identification ticket belonging to the cassette is positioned on the right level for being projected onto the film sheet. This projection is done as follows.

The identification ticket 10, exposed to a light source 12, is projected onto a first mirror 14 by means of a set of lenses 13. The light beam is bent by this mirror towards the mirror 15 from which it is bent once more to the mirror 16 so that a legible image of the ticket is formed at place point 17 of the film sheet 18.

The light source 12 is composed of an electronic flash and a short cylindrical reflector which concentrates and directs the light beam of the flash onto the ticket 10. Only a brief exposure is required since the projection of the ticket onto the film sheet takes place during the moving on of the film sheet between the roller pairs 6 and 7. After the removal of the film sheet from the cassette, it is gripped with its forward edge between the roller pair 6 and the film sheet is moved at a constant speed until it has left the apparatus. By executing the projection of the identification ticket with a flash light, a clear image of the identifying data is obtained on the film sheet. In the described example the speed of the film sheet amounts to 80 mm./sec.

The ignition of the flash is preferably controlled by the moving film sheet. For this purpose a micro-switch 19 (FIG. 3) is fitted immediately after the roller pair 7. When the forward edge of the film sheet has just passed this roller pair the switch arm of the micro-switch is pressed so that the contact is closed, whereby an electric discharge is generated in the flash bulb. In this way one can be sure that the identifying data are well-positioned in respect to the film sheet. If the micro switch 19 is placed before the roller pair 7 then the identifying data can be located exactly on the edge of the film sheet.

In order to have for each case a clear image of the identifying data on the film sheet it may be required to provide either on each cassette or in the exposure system in which the X-ray exposure occurs, a small X-ray absorbing screen preventing the X-ray exposure of that part of the film sheet where the identifying data will be projected in the cassette unloading apparatus.

Figure 4:
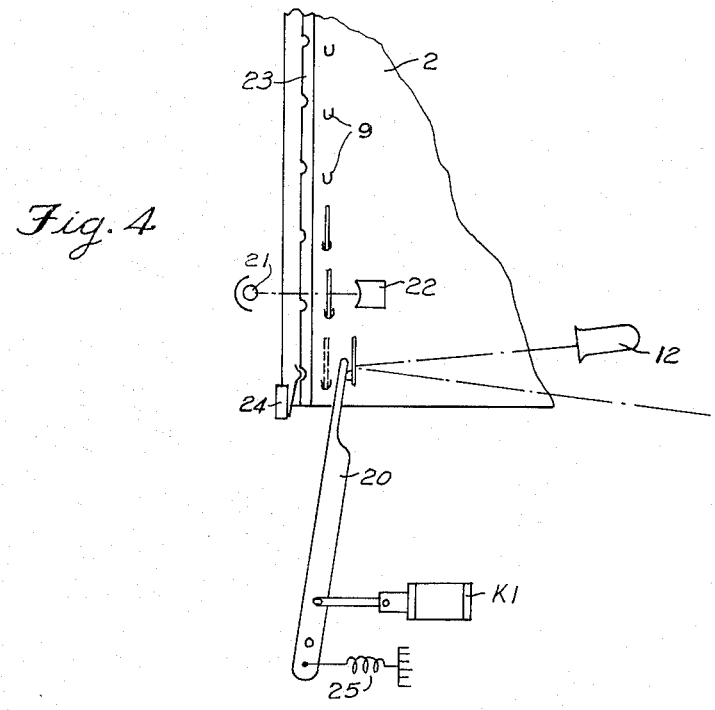
FIG. 4 is a modified embodiment of the light exposing system of the identification device.

According to a particular embodiment, the device of the present invention is provided with a cooperating gripping system 20 for gripping the identification tickets from the U-shaped clips 9, each time they reach the projection level, and for displacing them a short distance towards the light source 12 (FIG. 4). The gripping system comprises a clipping part which is not shown in detail; this clipping part is composed of 2 frame-shaped elements for receiving and clipping the identification tickets. The gripping mechanism is displaced by a solenoid $K_1$. It is an advantage of such a system like the above described gripping mechanism, that the identification tickets are always located in the same plane and at the same place for being projected, whereby a sharp and exactly positioned image is obtained on the film sheet. Such a result is not always possible if the tickets are not released from the clips 9. Besides, owing to an inaccurate positioning, or a partly wrinkled or curved identification ticket, it is not sure that the identifying data will be projected onto the film sheet in a legible way.

Figure 5:
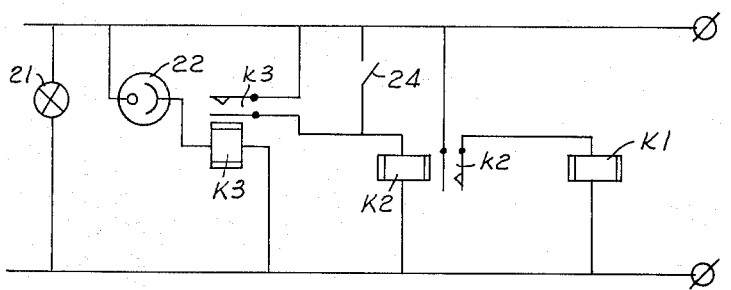
FIG. 5 represents the electric circuit of the identification device according to FIG. 4.

It is a further advantage of the above described device that it allows the possibility for identifying more cassettes with one single identification ticket. In practice it very often occurs that more images have to be made, immediately one after another, from the same patient or subject whereupon the cassettes are together placed in the unloading apparatus. These different images can be marked by only one identification ticket. For this purpose the light source 21 and the photoelectric cell 22 are positioned one section higher in respect of the gripping mechanism 20. By both these elements the presence or absence of an identification ticket can be controlled. Such operation of this device is illustrated by the following example, with reference to the FIGS. 4 and 5.

If 3 cassettes, belonging together, have to be unloaded, and marked by one identification ticket, the first cassette is placed in a section of the magazine 2 while the identification ticket is placed next to it; the two other cassettes are placed in the two following sections. After starting the apparatus the magazine 2 is step-wise lowered. Each time the magazine is moving downwardly by one section, the microswitch 24 is closed by the notches of bar 23, fitted to the magazine. Thereby the relay $K_2$ is excited, and the solenoid $K_1$ is excited over the contact $k_2$. The solenoid $K_1$ makes the gripping mechanism move until it reaches the position as indicated in FIG. 4.

Next, the unloading operation starts and the exposure occurs at the moment that the removed film sheet closes the microswitch 19 (FIG. 3). When the film sheet has left the roller pair 6, the magazine goes on moving downwardly until the following section is located in front of the unloading mechanism. Immediately after the moving of the magazine the microswitch 24 is opened again so that the gripping mechanism 20 returns to its resting position.

For each following section this operation cycle is repeated until the first cassette of the above-mentioned set of three cassettes has been unloaded. At that moment no ticket is present between the light source 21 and the photoelectric cell 22, since the second cassette is located at that level. The light beam of the light source 21 is now no longer interrupted so that the photoelectric cell 22 is exposed to light, whereby its ohmic resistance considerably decreases. The relay $K_3$ is thereby excited so that the contact $k_3$ is closed.

After the unloading of the cassette and exposure of the film, the magazine is moving further downwardly, thereby opening again the microswitch 24. Since the contact of this microswitch is connected in parallel with the contact $k_3$, the relay $K_2$ will remain closed and the solenoid $K_1$ remains excited. Hence the gripping mechanism 20 does not return to its resting position while the identification ticket remains in its place. Consequently when the following section is located in front of the unloading mechanism and the film sheet is removed, the exposure of the film sheet is done whilst using the same identification ticket. The same operation is repeated for the third cassette.

At the moment that said third cassette is located in front of the unloading mechanism, the light beam of the lamp 21 is interrupted by the identification ticket of the following cassette. The relay $K_3$ is released thereby while at the moment the microswitch 24 is opened by the lowering of the magazine, the relay $K_2$ is released whereby the circuit of the solenoid $K_1$ is interrupted. By this the gripping mechanism 20 returns to its resting position, while the identification ticket, being 3 times projected, is released from the clips 9 so that the following identification ticket is seized during the further lowering of the magazine.

It is quite clear that the foregoing device is only to be considered as a possible embodiment. Each device wherein the identification tickets are temporarily gripped for being projected, if desired, onto more than one film sheet, falls within the scope of the present invention.

Instead of using an electronic flash, the brief exposure can also be done with an ordinary incandescent lamp or bulb and an appropriate shutter mechanism. In this case it is desired to delay the impulse, controlling this shutter mechanism, until the lamp, after switching on, has reached the right temperature; alternatively the incandescent lamp is allowed to burn continuously.

An automatic apparatus for unloading cassettes, as represented in FIGURE 1 and which is provided with a device for identifying film sheets according to the present invention, is particularly appropriate for use in connection with an automatic developing, fixing and drying apparatus. Consequently it is possible to perform the treatment of the film sheet in a fully automatic way after the cassette has been exposed to light and introduced into the unloading device. A developing and fixing apparatus which can successfully be used for this application, is among others described in the British patent specification 889,384 and a suitable drying device is described in U.S. Patent No. 3,067,920.

We claim:

1. In an automatic apparatus having a light-tight casing, a movable magazine for receiving cassettes containing exposed X-ray film sheets and for successively transporting said cassettes into said light-tight casing, and means for removing the film sheets from the cassettes and for delivering the film sheets to developing apparatus, in combination data carrying means connected to said magazine,
means in said casing for removing said film sheets from said cassettes and for transporting said film sheets through an outlet opening of said casing,
means in said casing for illuminating said data carrying means,
lens means mounted in said casing for projecting an image of said data carrying means,
reflecting means mounted in said casing and positioned with respect to said lens means to project the image of said data carrying means upon said film sheets engaged by said transporting means,
switch means mounted on said apparatus,
means connected to said magazine for actuating said switch means upon movement of said magazine,
means for gripping and positioning said data carrying means relative to said illuminating means and said projecting means,
operating means connected to said switch means for actuating said gripping and positioning means,
a light source and a light sensitive means disposed on opposite sides of one of said data carrying means,
and means for connecting said light sensitive means to said operating means to control the latter in response to variations in the light intensity on said light sensitive means.

2. Apparatus according to claim 1 wherein said light source and said light sensitive means are disposed on opposite sides of the data carrying means preceding the data carrying means being exposed on said film sheet.

3. Apparatus according to claim 1 wherein said gripping and positioning means comprises a lever biased by spring means into an inoperative position, and wherein said operating means include a solenoid connected to said lever for actuating said lever into the operative position.

4. In an automatic apparatus having a light-tight casing, movable support means for receiving cassettes containing exposed film sheets and for successively transporting said cassettes into said light-tight casing, and means for removing the film sheets from the cassettes and for delivering the film sheets to developing apparatus, in combination
data carrying means associated with respective cassettes on said support means,
means in said casing for transporting the film sheets removed from said cassettes through an outlet opening of said casing,
a light source in said casing for illuminating said data carrying means,
lens means mounted in said casing for projecting an image of data on said data carrying means,
reflecting means mounted in said casing and positioned with respect to said lens means to project the image from said data carrying means onto said film sheets engaged by said transporting means, and
a switch mounted at said transporting means for engagement by said film sheets and connected to said light source for operating the latter upon operation of said switch by said film sheets.

References Cited by the Examiner

UNITED STATES PATENTS

| 1,974,174 | 9/1934 | Chamberlain | 95—1.1 |
| 2,652,754 | 9/1953 | Dedek | 95—1.1 |
| 3,111,585 | 11/1963 | Sano et al. | 250—66 |

JOHN M. HORAN, *Primary Examiner.*

NORTON ANSHER, *Examiner.*